United States Patent [19]
Goto

[11] Patent Number: 5,909,506
[45] Date of Patent: Jun. 1, 1999

[54] METHOD OF CORRECTING COLORS AND COLOR IMAGE PROCESSING APPARATUS

[75] Inventor: Makio Goto, Nara, Japan

[73] Assignee: Sharp Kabushiki Kaisha, Osaka, Japan

[21] Appl. No.: 08/753,702

[22] Filed: Nov. 27, 1996

[30] Foreign Application Priority Data

Dec. 15, 1995 [JP] Japan .................................. 7-327693

[51] Int. Cl.$^6$ ...................................................... G06K 9/00
[52] U.S. Cl. ........................................... 382/167; 382/162
[58] Field of Search .................................... 382/162, 167, 382/112, 155; 358/518, 504, 516, 537, 523, 538, 525; 348/179, 181, 182

[56] References Cited

U.S. PATENT DOCUMENTS 5,162,899 11/1992 Nara et al. ............................... 358/518
5,414,537 5/1995 Omuro et al. ........................... 358/518

OTHER PUBLICATIONS

S. Taku, et al., "Method for Compensating Distance Between Signals for Memory Device", Japanese Examined Patent, Publication No. 58–16180, Mar. 30, 1983.

S. Yoshiharu, et al., "Method and Device for Adjusting Color of Color Image", Japanese Laid–Open Patent, Application No. 5–119752, May 18, 1993.

T. Tsunoda, "Typical Color Selection Method", Japanese Laid–Open Patent, Application No. 5-159050, Jun. 25, 1993.

*Primary Examiner*—Leo H. Boudreau
*Assistant Examiner*—Dmitry A. Novik
*Attorney, Agent, or Firm*—Dike, Bronstein, Roberts & Cushman, LLP; David G. Conlin

[57] ABSTRACT

A color correcting device includes (1) a color correcting section furnished with a plurality of color correcting systems having their respective color correcting rates and color correcting accuracy, (2) a representative color selecting section for selecting representative colors from a color separation signal of an original image, and (3) a color correcting system selecting section for selecting one of the color correcting systems based on the color correcting result of the representative colors, whereby the color correcting device converts the color separation signal of the original image into a color correcting signal using the color correcting system selected by the color correcting system selecting section. This arrangement makes it possible to judge the quality of a color-corrected image without subjecting all the input image data of the original image to the color correcting operation. Consequently, a copy image of the original image can be made efficiently with satisfactory color correcting accuracy.

21 Claims, 8 Drawing Sheets

METHOD OF CORRECTING COLORS AND COLOR IMAGE PROCESSING APPARATUS

FIELD OF THE INVENTION

The present invention relates to a method of correcting colors of an input original image, and to a color image processing apparatus furnished with a color correcting function, such as a color copying machine and a color printer.

BACKGROUND OF THE INVENTION

Conventionally, a color copying machine, a color printing machine, and the like are known as a color image processing apparatus. The color image processing apparatus serves as an image input/output device that reads a color original image by read means, such as a color scanner, and outputs a copy of the original image by output means, such as a color printer.

However, if the image data are supplied intact from the read means to the output means, a copy image hardly renders the same colors as those of the original image.

Therefore, the colors of input image data must be corrected so that a copy image renders approximate colors to those of the original image. For example, methods of using a color correcting matrix or a color correcting neural network are adopted to correct the colors of the input image data. In these example methods, an output device outputs a full-color sample of the color gamut first, so that all the colors the output device can output will be corrected uniformly in the input image data. Then, the read means again reads the output color sample to construct color correcting means, such as a matrix and a neural network. The color image processing apparatus uses the color correcting means thus constructed. Accordingly, a copy image of the original image is produced by correcting the colors of the input image data using the above color correcting means.

Incidentally, the color correcting operation by the color correcting means takes longer as the color correcting accuracy is upgraded. In other words, the lower the color correcting accuracy, the faster the color correcting operation. For this reason, a conventional color image processing apparatus includes a plurality of color correcting means having their respective color correcting rates and color correcting accuracy, and the one with the highest color correcting rate is selected among those having allowable color correcting accuracy for the input image data.

However, the conventional color image processing apparatus always outputs a color-corrected image of the original image to judge the image quality thereof. In other words, all the input image data are subject to the color correcting operation each time the quality of a color-corrected image is judged. Thus, correcting the colors and judging the result has been time consuming, thereby making the overall operation inefficient.

Additionally, in the above color correcting methods, the color correcting matrix or neural network is constructed in advance as the color correcting means to correct the input image data in the entire color gamut of the output device. Although these methods are advantageous in that the image data are corrected in the entire color gamut of the output device with satisfactory accuracy, colors outside of that gamut are not corrected accurately and some colors can not be corrected as one desires.

Thus, the conventional color image processing apparatus has a problem that it can not produce a satisfactory copy image when an input image includes a number of colors which can not be corrected in a desired manner by the color correcting means.

SUMMARY OF THE INVENTION

It is therefore an object of the present invention to provide a method of correcting colors and a color image processing apparatus, which can produce a copy image of an original image efficiently with satisfactory color correcting accuracy by extracting representative colors and judging the quality of a color-corrected image based on the representative colors alone instead of subjecting all the input image data of the original image to a color correcting operation.

To fulfill the above first object, the method of correcting colors of the present invention comprises the steps of:

reading an original image to produce a color separation signal thereof;

extracting some colors from the color separation signal of the original image as representative colors;

correcting the extracted representative colors; and correcting the colors of the original image based on an output of the color-corrected representative colors.

According to the above method of correcting colors, the colors of the input image are corrected based on the color correcting result of the representative colors. Thus, the color correcting accuracy can be judged faster by judging the same based on the above color correcting result than judging the same after correcting all the colors of the input image in the conventional manner.

The above object is also fulfilled by a color image processing apparatus for outputting a copy image after correcting colors of an input original image, comprising:

a read section for reading an original image to produce a color separation signal;

a color correcting section for correcting colors of the color separation signal;

an image output section for outputting a visible image based on the color-corrected color separation signal; and     a representative color selecting section for selecting some of characteristic colors from all colors of the original image as representative colors based on the color separation signal,     wherein the color correcting section corrects colors of the color separation signal of the representative colors first, and thence corrects colors of the color separation signal of the original image based on an output of the color-corrected representative colors from the image output section.

According to the above arrangement, an original image is read by the read section to produce a color separation signal thereof, and based on which some of the characteristic colors are selected from all the colors of the original image as the representative colors by the representative color selecting section. Then, the representative colors are corrected first by the color correcting section and the color-corrected representative colors are outputted from the image output section. The colors of the original image are corrected based on the above output, and finally, a copy image is produced by the image output section.

To correct the colors of the original image with high accuracy, a color-corrected image must be outputted at least once before a copy image is made. However, since the color image processing apparatus of the present invention corrects the representative colors alone, the overall image processing can be accelerated.

As has been explained, according to the method of correcting colors and the color image processing apparatus of the present invention, the colors of the input image are corrected based on the color correcting result of the representative colors alone. Thus, for example, judging the quality of a color-corrected image based on the above color correcting result can speed up the judging operation than judging the same after correcting all the colors of the input image in the conventional manner.

In addition, the method of correcting colors and the color image processing apparatus of the present invention may be arranged in such a manner to select an optimal color correcting system for each input image among a plurality of them, so that the colors of each input image can be corrected faster and more accurately.

The above color image processing apparatus may be arranged in such a manner that the color correcting section includes:

a plurality of color correcting systems having their respective color correcting rates and color correcting accuracy; and a color correcting system selecting section for selecting one of the plurality of color correcting systems which can correct the representative colors in a best manner, so that the color correcting section corrects the colors of the color separation signal of the original image using the color correcting system selected by the color correcting system selecting section.

According to the above arrangement, the color correcting section converts the color separation signal of the original image into the color correcting signal using a color correcting system such that can correct the color separation signal of the representative colors of the input image in the best manner. Consequently, a copy image faithful to the original image can be made.

The above color image processing apparatus may be arranged in such a manner that the color correcting section includes:

a color correcting system having a given coefficient for correcting colors; and a learning section for computing a coefficient such that enables an optimal color correction for the original image based on teacher data and learning data, the teacher data being a color correcting signal obtained by correcting the representative colors of the original image using the color correcting system, the learning data being a color separation signal obtained by reading the outputted visible image by the read section, so that the color correcting system is reconstructed in a best manner for the original image by replacing its coefficient with the coefficient computed by the learning section to correct colors of the original image.

According to the above arrangement, the coefficient of the color correcting system is changed based on the teacher data and learning data, so that the color correcting system can correct the color separation signal of the original image in the best manner.

Since the colors of the original image are corrected by the color correcting system whose correcting accuracy can be changed, compared with the case where an optimal color correcting system is selected among those having their respective color correcting rates and color correcting accuracy, the colors can be corrected with higher accuracy. Moreover, even colors which can not be corrected by any of the existing color correcting systems can be corrected.

Consequently, since the quality of the color-corrected image is judged using only the representative colors selected from all the colors of the original image, a copy image of the original image can be made efficiently with high color correcting accuracy.

For a fuller understanding of the nature and advantages of the invention, reference should be made to the ensuing detailed description taken in conjunction with the accompanying drawings.

DESCRIPTION OF THE EMBODIMENTS

Embodiment 1

The following description will describe an example embodiment of the present invention.

Figure 1:
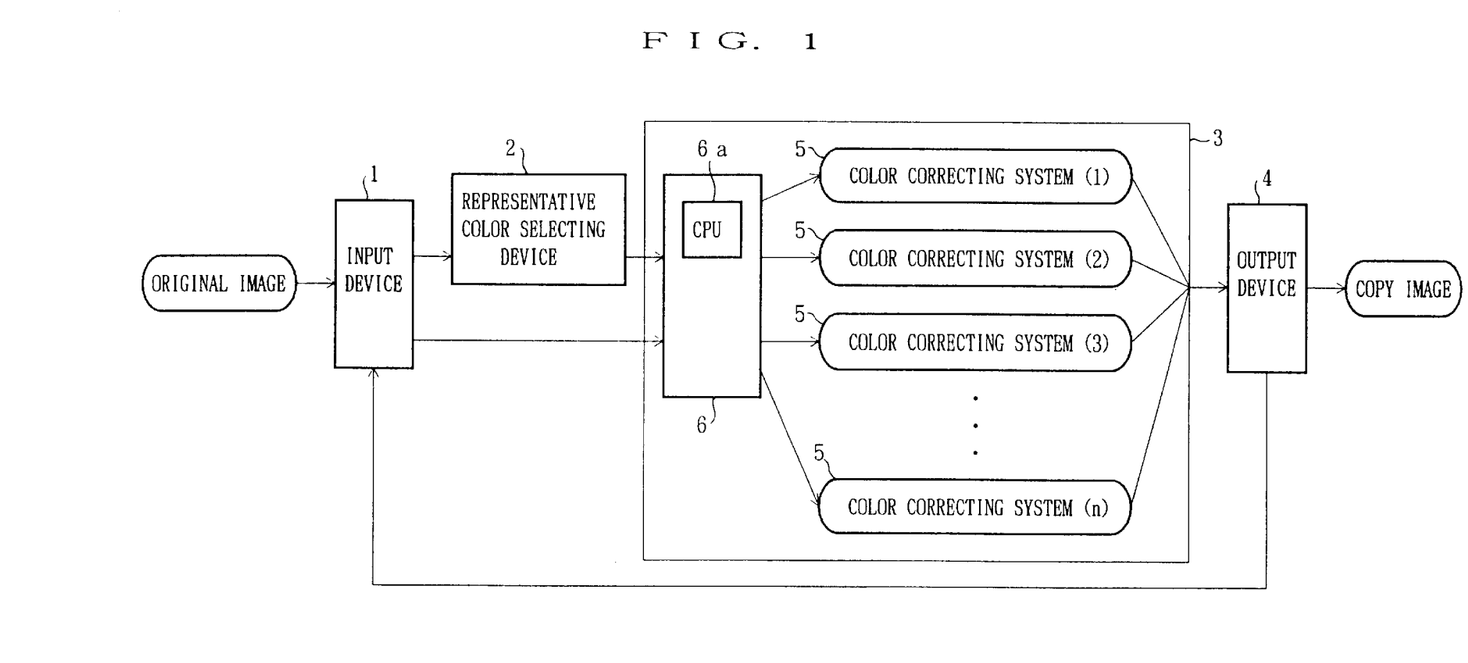
FIG. 1 is a block diagram showing a schematic structure of an example color image processing apparatus in accordance with an embodiment of the present invention.

As shown in FIG. 1, a color image processing apparatus of the present embodiment comprises an input device 1, a representative color selecting device 2, a color correcting device 3, and an output device 4. The input device 1 serving as read means reads an original image and outputs a color separation signal. The representative color selecting device 2 serving as representative color selecting means selects representative colors from the color separation signal outputted from the input device 1. The color correcting device 3 serving as color correcting means converts the color separation signal into a color correcting signal. The output device 4 serving as image output means outputs a copy image based on the color correcting signal outputted from the color correcting device 3.

To be more specific, the input device 1 includes a color scanner for optically scanning a color original image to produce color separation signals of R(Red), G(Green), and B (Blue) (hereinafter, collectively referred to as RGB signal). The RGB signal is outputted to both the representative color selecting device 2 and color correcting device 3. The color scanner used herein separates the optically scanned image into three colors of RGB with 256 levels in each.

The representative color selecting device 2 receives the RGB signal of the input image data from the input device 1. The representative color selecting device 2 extracts several to tens of characteristic representative colors from the input image data by any known representative color selecting method, a good example of which is disclosed in Japanese Laid-open Patent Application No. 159050/1993 (Tokukaihei 5-159050) . In this example method, each pixel of a color image is mapped on a color space that uses the color components (RGB) as axes. Then, colors of the pixels are selected as the representative colors in order of farther distance within the space.

The color correcting device 3 includes a plurality of color correcting systems 5 and a color correcting system selecting section 6 serving as color correcting system selecting means. Each color correcting system 5 converts the input RGB signal into a color correcting signal, namely, a density signal of C(Cyan), M(Magenta), Y(Yellow), and K(Black) (hereinafter, collectively referred to as CMY(K) signal). The color correcting system selecting section 6 includes a CPU (Central Processing Unit) 6a and selects an optimal color correcting system 5 for each input image data. The output device 4 used herein includes a 3-color printer using inks colored in CMY, respectively. In case of a 4-color printer, an ink colored in K is added.

Figure 3A:
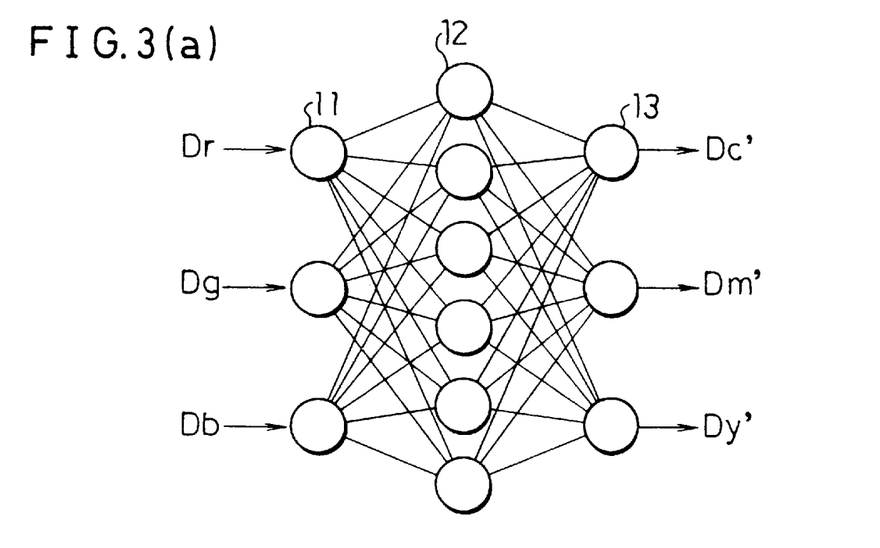
FIG. 3(a) is a view explaining a color correcting neural network adopted as color correcting means in the color image processing apparatus of FIG. 1 when a 3-color (Cyan, Magenta, and Yellow) printer is used.
Figure 3B:
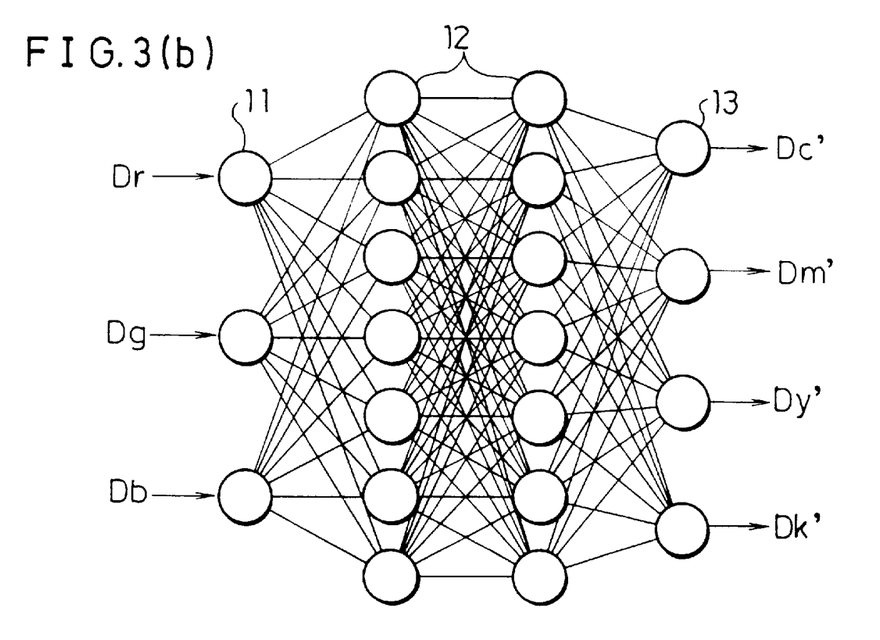
FIG. 3(b) is a view explaining a color correcting neural network adopted as the color correcting means in the color image processing apparatus of FIG. 1 when a 4-color (Cyan, Magenta, Yellow, and Black) printer is used.
Figure 4A:
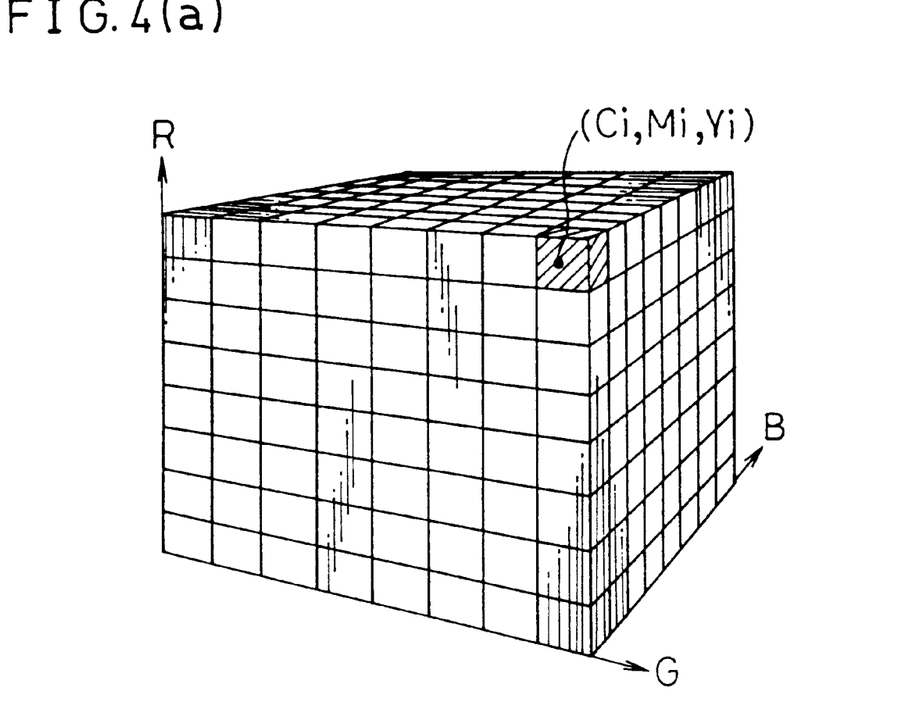
FIG. 4(a) is a view explaining a color separation signal space divided into unit cubes when a color correcting look-up table method is adopted as the color correcting means in the color image processing apparatus of FIG. 1.
Figure 4B:
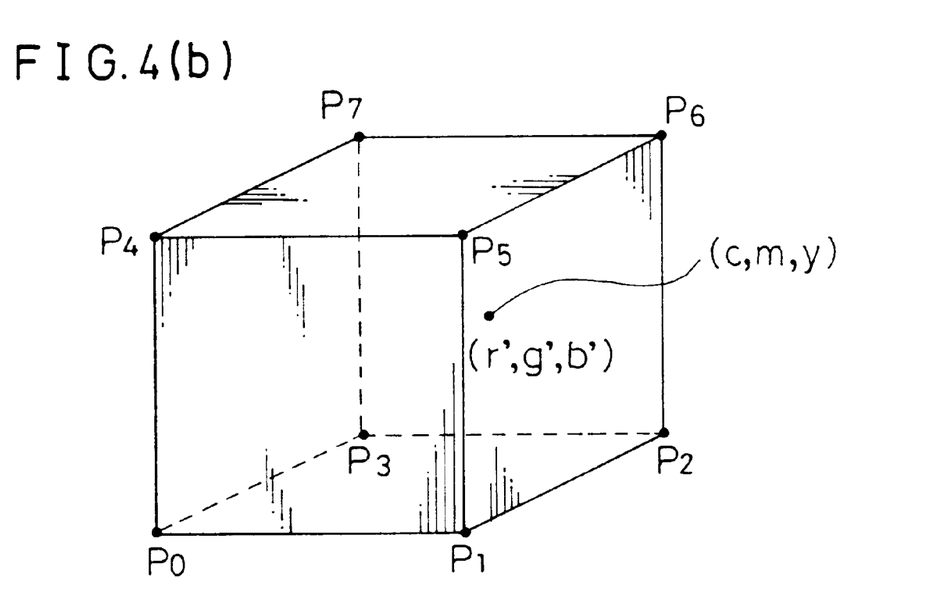
FIG. 4(b) is a view explaining one of the above unit cubes forming the color separation signal space.

Each color correcting system 5 adopts a different color correcting method, such as a color correcting matrix method, a color correcting neural network method as shown in FIGS. 3 (a) and 3 (b), and a color correcting look-up table method as shown in FIGS. 4(a) and 4(b). Note that those adopting the same kind of method have different color correcting accuracy. Since each color correcting system 5 adopts one method with different color correcting accuracy, the color correcting systems 5 serve as individual color correcting systems (1), (2), . . . ,(n) having their respective color correcting rates and correcting accuracy for the RGB signal, which will be described in detail below.

The color correcting system selecting section 6 selects one color correcting system 5 based on the RGB signals inputted respectively from the input device 1 and representative color selecting device 2, and outputs the RGB signal to the selected color correcting system 5.

Next, how the color correcting system selecting section 6 selects one color correcting system 5 will be explained in the following.

In the first place, the color correcting system selecting section 6 selects one color correcting system 5 which has the highest color correcting rate for the RGB signal of the representative colors outputted from the representative color selecting device 2. Then, after the output device 4 outputs a copy image based on the CMY signal of the representative colors outputted from the fastest color correcting system 5, the CPU 6a serving as judging means computes an error between the RGB signal from the output device 4 and the RGB signal of the initial representative colors selected by the color representation selecting device 2 to judge whether the error is within tolerance or not. When the error is judged to be within tolerance, the currently selected color correcting system 5 is used to convert the RGB signal of the original image from the input device 1 into the CMY signal. When the error is judged otherwise, the second-fastest color correcting system 5 is selected to convert the RGB signal of the representative colors, and the error is examined in the above manner again. Thus, the color correcting system selecting section 6 sequentially selects the color correcting systems 5 in order of high color correcting rate until the representative colors are corrected satisfactory. Consequently, an optimal color correcting system 5 can be selected by the color correcting system selecting section 6.

The color correcting system selecting section 6 computes the error between the RGB signals using a geometric distance therebetween. For example, the distance is computed using a coordinate of each RGB signal in the RGB space.

The output device 4 includes a color printer, through which a copy image is outputted based on the CMY signal outputted from the color correcting device 3. The color printer used herein prints out an image in CMY with 256 levels in each using inks colored in CMY, respectively.

Figure 2:
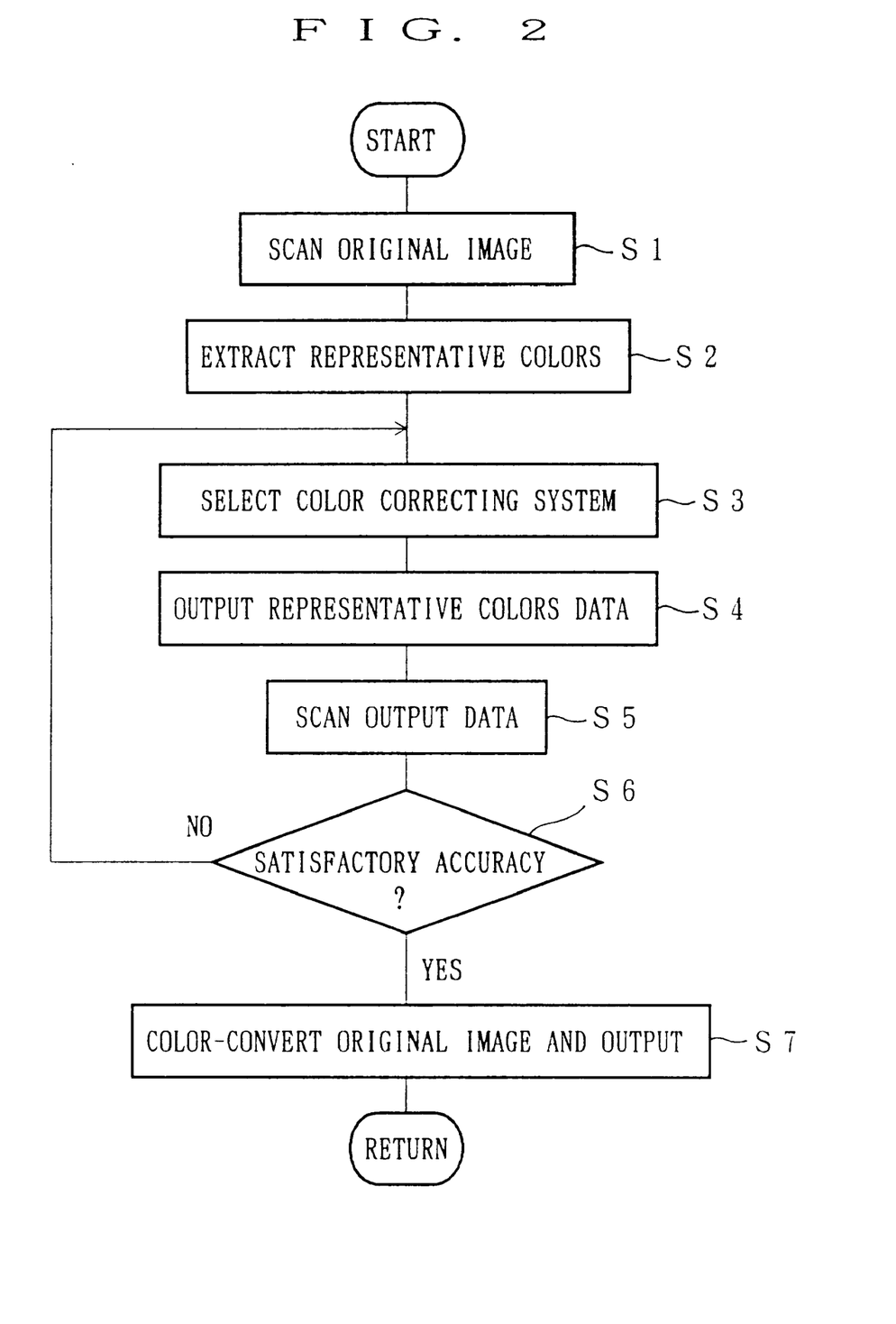
FIG. 2 is a flowchart detailing a color correcting operation of the color image processing apparatus of FIG. 1.

The color correcting procedure of the color image processing apparatus arranged as above will be explained with reference to the flowchart of FIG. 2.

To begin with, the input device 1 scans an original image by means of the color scanner, and outputs the RGB signal of the original image read by the scanner to the representative color selecting device 2 (S1).

Then, the representative color selecting device 2 selects several to tens of characteristic colors from the input RGB signal and extracts the same as the representative colors (S2).

Subsequently, the color correcting system selecting section 6 in the color correcting device 3 selects one of the color correcting systems 5, for example, the color correcting system (1) adopting the converting matrix method with the highest color correcting rate (S3). Then, the representative color data are corrected by the color correcting system (1) and outputted from the printer of the output device 4 in the form of an image (S4). The input device 1 again scans the above output image by means of the scanner (S5).

Next, the color correcting system selecting section 6 compares the RGB signal of the color-corrected representative colors obtained in S5 with the RGB signal of the initial representative color obtained in S2, and judges whether the representative colors are corrected with satisfactory accuracy or not (S6).

When the color correcting accuracy is judged to be satisfactory in S6, in other words, when the error between the RGB signals of the representative colors before and after the color correction is judged to be within tolerance, the RGB signal of the original image from the input device 1 is converted into the CMY signal by the color correcting system (1) selected in S3. Subsequently, the CMY signal from the color correcting system (1) is outputted to the output device 4 (S7).

On the other hand, when the color correcting accuracy is judged to be unsatisfactory in S6, in other words, when the error between the RGB signals of the representative colors before and after the color correction is judged to be out of tolerance, the color image processing apparatus returns to S3, and the color correcting system selecting section 6 selects the color correcting system (2) having higher accuracy than the color correcting system (1). Then, the representative colors are converted by the color correcting system (2) and the color image processing apparatus proceeds to S4 through S6 again.

According to the above color correcting procedure, S3 through S6 are carried out repetitively until the satisfactory color correcting accuracy is achieved, thereby making it possible to select the optimal color correcting system 5 for each original image.

Next, for further understanding, the color correcting system 5 will be explained more in detail.

In the first place, the color correcting system 5 adopting the color correcting matrix method will be explained.

In the color correcting matrix method, a quantity of ink $(D_c', D_m', D_y')$ that the printer of the output device 4 uses to print out an image after correcting the representative colors is determined using Equation (1):

$$\begin{bmatrix} D_c' \\ D_m' \\ D_y' \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} \times \begin{bmatrix} D_r \\ D_g \\ D_b \\ 1 \end{bmatrix} \quad (1)$$

where $(D_r, D_g, D_b)$ is the RGB signal from the scanner of the input device 1.

As can be understood from Equation (1) above, the above color correcting matrix method adopts a linear masking technique. Alternatively, the color correcting matrix method using a non-linear masking technique expressed by Equation (2) below may be adopted:

$$\begin{bmatrix} D_c' \\ D_m' \\ D_y' \end{bmatrix} = \begin{bmatrix} a_{101} & a_{102} & \cdots & a_{110} \\ a_{201} & a_{202} & \cdots & a_{210} \\ a_{301} & a_{302} & \cdots & a_{310} \end{bmatrix} \times \begin{bmatrix} D_r \\ D_g \\ D_b \\ D_r^2 \\ D_g^2 \\ D_b^2 \\ D_r \cdot D_g \\ D_g \cdot D_b \\ D_b \cdot D_r \\ 1 \end{bmatrix} \quad (2)$$

In other words, upon input of the RGB signal $(D_r, D_g, D_b)$ from the scanner of the input device 1, a quantity of ink $(D_c', D_m', D_y')$ after the color correction is determined based on the matrix coefficients $(a_{101}-a_{310})$. Then, the printer of the output device 4 outputs the color-corrected representative colors using the quantity of ink $(D_c', D_m', D_y')$ thus determined. In this case, the non-linear nature of ink is taken into account of the color correcting matrix method.

In the second place, the color correcting system 5 adopting the color correcting neural network will be explained.

As shown in FIG. 3 (a), the color correcting neural network comprises an input layer 11, an intermediate layer 12, and an output layer 13. To be more specific, when the input layer 11 receives the RGB signal $(D_r, D_g, D_b)$ of each pixel in the input image data, a quantity of ink $(D_c', D_m', D_y')$ that the printer of the output device 4 uses is outputted from the output layer 13 through the intermediate layer 12.

FIG. 3(a) shows the color correcting neural network when a 3-color printer using inks colored respectively in CMY is used. FIG. 3(b) shows another color correcting neural network when a 4-color printer using inks colored respectively in CMYK is used, and two intermediate layers 12 are used herein.

In the third place, the color correcting system 5 adopting the color correcting look-up table method will be explained.

The color correcting look-up table is a color correcting operation to convert the coordinates of the RGB signal space into those in the CMY signal space. In this method, the RGB space is divided into a plurality of unit cubes as shown in FIG. 4(a), and the coordinates of the optimal CMY signal for the input RGB signal are given to their respective mapping coordinates at the vertexes of the unit cubes. Thus, the CMY signal corresponding to the input RGB signal from the color correcting system 5 is read from the mapping coordinates in the RGB space and outputted to the output device 4. If the coordinate of the input RGB signal does not have the matching coordinate at any of the vertexes of the unit cubes, a corresponding CMY signal is determined through a 3-D color gamut mapping computation using the data at the vertexes of the unit cube around the coordinate of the input RGB signal.

For further understanding, the 3-D color gamut mapping computation based on the unit cubes forming the RGB space will be explained with reference to FIG. 4(b).

In the drawing, $P_0$ through $P_7$ respectively represent vertexes of one unit cube. Here, let $P_0$ be the original point, (r', g', b') be a relative coordinate, and C(Pi), M(Pi), Y(Pi), (i=0, 1, 2, ..., 7) be an output from each vertex, then (c, m, y) of the CMY signal is computed using Equations (3) through (5):

$$c = (1-r')(1-g')(1-b')C(P_0) + (1-r')g'(1-b')C(P_1) + \quad (3)$$
$$(1-r')g'b'C(P_2) + (1-r')(1-g')g'C(P_3) +$$
$$r'(1-g')(1-b')C(P_4) + r'g'(1-b')C(P_5) +$$
$$r'g'b'C(P_6) + r'(1-g')b'C(P_7)$$

$$m = (1-r')(1-g')(1-b')M(P_0) + (1-r')g'(1-b')M(P_1) + \quad (4)$$
$$(1-r')g'b'M(P_2) + (1-r')(1-g')g'M(P_3) +$$
$$r'(1-g')(1-b')M(P_4) + r'g'(1-b')M(P_5) +$$
$$r'g'b'M(P_6) + r'(1-g')b'M(P_7)$$

$$y = (1-r')(1-g')(1-b')Y(P_0) + (1-r')g'(1-b')Y(P_1) + \quad (5)$$
$$(1-r')g'b'Y(P_2) + (1-r')(1-g')g'Y(P_3) +$$
$$r'(1-g')(1-b')Y(P_4) + r'g'(1-b')Y(P_5) +$$
$$r'g'b'Y(P_6) + r'(1-g')b'Y(P_7)$$

As has been explained, the color correcting systems 5 adopt at least one of the color correcting matrix method, color correcting neural network method, and color correcting look-up table method as the color correcting method. To be more specific, each color correcting system 5 may adopt only one method at different color correcting rates and color correcting accuracy, or each may adopt different method at different color correcting rates and color correcting accuracy.

Generally, the color correcting operation by the color correcting system 5 takes longer as the color correcting accuracy is upgraded. In other words, the lower the color correcting accuracy, the faster the color correcting system 5 operates. For this reason, it is necessary to select an optimal color correcting system 5 for a subjected original image based on a combination of the color correcting rate and color correcting accuracy.

The color correcting accuracy is upgraded in order of color correcting matrix method, color correcting look-up table method, and color correcting neural network method. Thus, the color correcting rate becomes higher in order opposite to the above, that is, color correcting neural network method, color correcting look-up table method, and color correcting matrix method.

Thus, when the color correcting systems 5 adopt all the above three methods, the color correcting system selecting 6 selects the color correcting systems 5 adopting the color correcting matrix method first, followed by those adopting the color correcting look-up table method, and those adopting the color correcting neural network method. Therefore, the color image processing apparatus of the present embodiment selects the fastest color correcting system 5 among those having satisfactory accuracy for a subjected image based on a combination of the color correcting rates and color correcting accuracy. Consequently, the color image processing apparatus of the present embodiment can always correct colors in the best manner and make a copy image faithful to each original image.

Moreover, the color image processing apparatus of the present embodiment judges the color correcting accuracy using only several to tens of representative colors extracted from the original image. Thus, the color correcting operation is accelerated compared with the conventional case where all the colors in the original image are corrected to judge the color correcting accuracy.

As has been explained above, the color correcting systems 5 installed in the color correcting apparatus 3 in the present embodiment uses a plurality of color correcting systems which have been constructed in advance to correct colors in the best manner based on the color correcting result of the representative colors. However, there may be a case that an original image has a color which can not be corrected adequately by the pre-installed color correcting systems. To eliminate this problem, Embodiment 2 below describes a color image processing apparatus which can correct colors each time it reads an original image by reconstructing the color correcting system based on the RGB signal and CMY signal of the representative colors, so that a copy image faithful to the original image is made in a reliable manner.

Embodiment 2

The following description will describe another example embodiment of the present invention.

Figure 5:
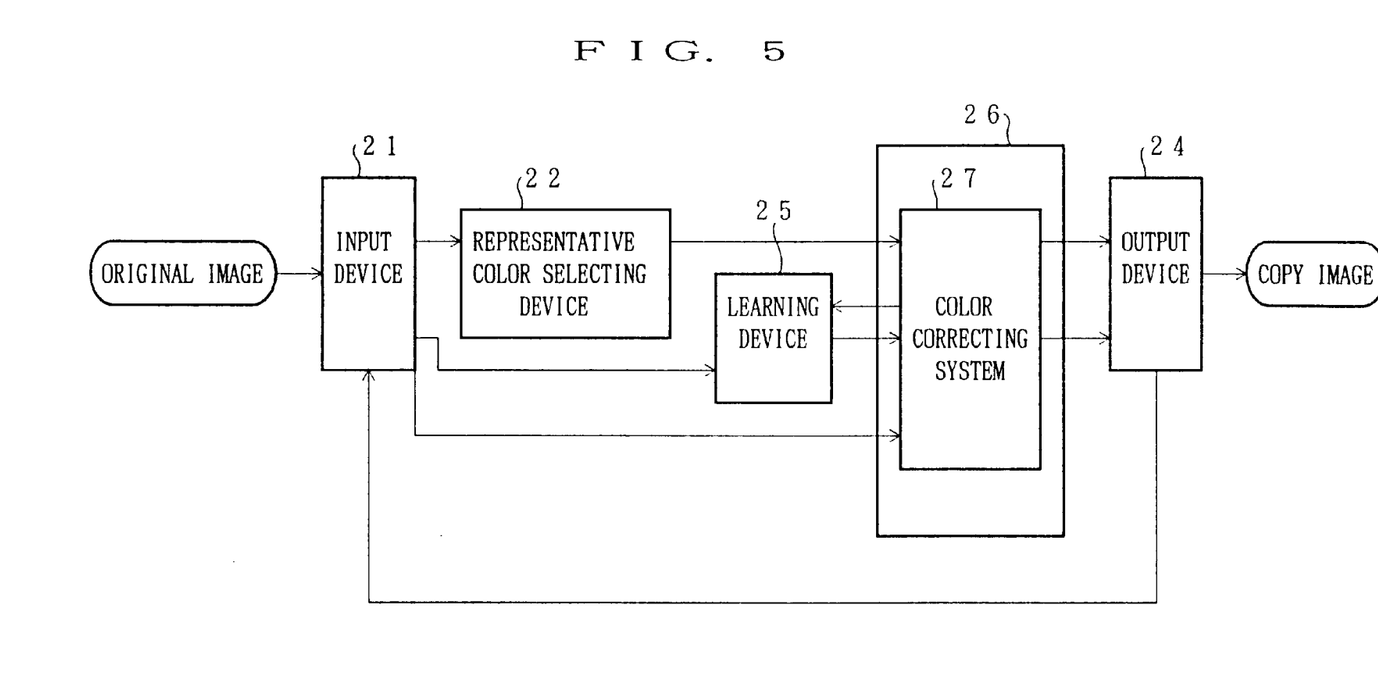
FIG. 5 is a block diagram showing a schematic structure of an example color image processing apparatus in accordance with another embodiment of the present invention.

Compared with its counterpart in Embodiment 1, a color image processing apparatus of the present embodiment additionally includes a learning device. To be more specific, as shown in FIG. 5, the image processing apparatus of the present embodiment comprises an input device 21, a representative color selecting device 22, an output device 24, a learning device 25, and a color correcting device 26 including a reconstructible color correcting system 27. The color correcting system 27 has a given color correcting coefficient so that it can be reconstructed in the best manner for an original image by changing its coefficient. The input device 21, representative color selecting device 22, and output device 24 are identical with their respective counterparts in Embodiment 1 and the explanation of these components is not repeated for the explanation's convenience.

The learning device 25 learns coefficients of the color correcting matrix or the linking coefficients of the color correcting neural network as the coefficient of the color correcting system 27 in the color correcting device 26 and outputs the learned matrix coefficients or linking coefficients to the color correcting device 26. That is to say, the color correcting device 26 replaces the initial coefficient with input coefficients from the learning device 25 to reconstruct the color correcting system 27 in the best manner for each original image. Consequently, the color image processing apparatus of the present embodiment reduces a correcting error for each original image, and therefore, can correct the colors in the best manner.

The following description will describe a method of reconstructing the color correcting system 27 in the color correcting device 26.

To begin with, n representative colors $(R_i, G_i, B_i)$ (i=1–n) are selected from the original image and corrected by the color correcting device 26 with the color correcting system 27 having a given coefficient to produce a CMY signal $(C_i, M_i, Y_i)$, which is outputted to the learning device 25 as teacher data.

The CMY signal $(C_i, M_i, Y_i)$ is outputted from the output device 24 and read by the input device 21 to produce an RGB $(R_i', G_i', B_i')$ signal, which is outputted to the learning device 25 as the learning data.

In case that the color correcting system 27 adopts the color correcting matrix method, the learning device 25 computes the matrix coefficients using the method of least squares based on the teacher data and learning data. Assume that coefficients $(a_{11}, a_{12}, a_{13}, a_{14})$ are to be computed based on a Cyan signal when the color correcting matrix is the one as shown in Equation (1) above. Then, since there are as many combinations of $(C_i, R_i', G_i', B_i')$ as the number of the representative colors, the following relationship is established:

$$C_i = a_{11} R_i' + a_{12} G_i' + a_{13} B_i' + a_{14} + e_i \qquad (6)$$

where i=1, 2, ... n.

Thus, the coefficients $(a_{11}, a_{12}, a_{13}, a_{14})$ such that makes the smallest $e_1^2 + e_2^2 + \ldots + e_n^2$ in Equation (6) above is computed.

On the other hand, in case that the color correcting system 27 adopts the color correcting neural network method, the learning device 25 computes the linking coefficients of the neural network using the back propagation method.

The back propagation method is a method for computing the linking strength without feedback linking in a neural network comprising the input layer 11, intermediate layer 12 and output layer 13 as shown in FIG. 4(a) of Embodiment 1. Like the above cases, the learning device 25 compares the teacher data and learning data and computes the linking strength such that minimizes the error therebetween. Note that the CMY signal $(C_i, M_i, Y_i)$ produced by correcting the selected representative colors of the original image with the color correcting system 27 having a given coefficient is used as the teacher data, and the RGB signal $(R_i', G_i', B_i')$ produced by outputting the teacher data $(C_i, M_i, Y_i)$ from the output device 24 and reading the same by the input device 21 is used as the learning data.

The learning device 25 computes the matrix coefficients or linking coefficients in the manner above, and outputs the same to the color correcting device 26.

The color correcting device 26 reconstructs the color correcting system 27 based on the input matrix coefficients or linking coefficients from the learning device 25.

Therefore, the color image processing apparatus arranged as above converts the RGB signal of the original image from the input device 1 into the CMY signal using the color correcting system 27 thus reconstructed in the color correcting device 26, and outputs a copy image from the output device 24 based on the above CMY signal.

As has been explained, the color image processing apparatus arranged as above reconstructs the color correcting system 27 in the color correcting device 26 based on the representative colors of the original image. Thus, a copy image which has been color-corrected in the best manner with high accuracy can be made for each original image.

In the color image processing apparatus of the present embodiment, the coefficients of the color correcting system 27 are computed by the learning device 25, and based on which the color correcting system 27 is reconstructed automatically. However, there is a case where the reconstruction of the color correcting system 27 can be omitted. Since it takes quite a long time for the learning device 25 to compute the matrix coefficients of the color correcting matrix or linking coefficients of the color correcting neural network, the efficiency of the overall color correcting operation is reduced if the color correcting system 27 is reconstructed unnecessarily followed by a needless color correcting operation.

To eliminate this problem, Embodiment 3 below describes a color image processing apparatus which reconstructs the color correcting system 27 pre-installed in the color correcting device 26 only when the reconstruction is judged to be necessary based on the color correcting result of the representative colors of the original image.

Embodiment 3

The following description will describe a further example embodiment of the present invention.

Figure 6:
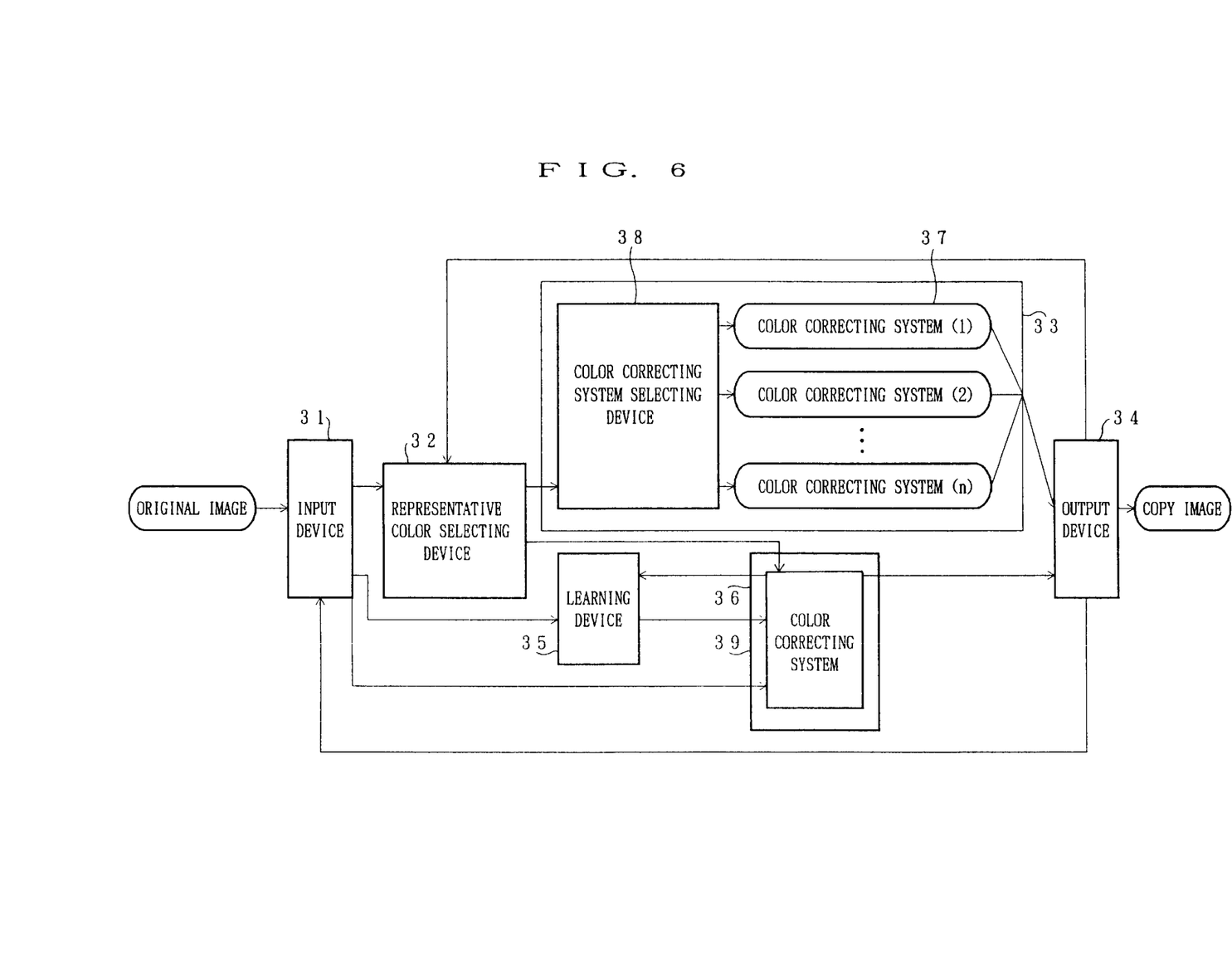
FIG. 6 is a block diagram showing a schematic structure of an example color image processing apparatus in accordance with a further embodiment of the present invention.

Compared with its counterpart in Embodiment 2 of FIG. 5, a color image processing apparatus of the present embodiment additionally includes another color correcting device. To be more specific, as shown in FIG. 6, the color image processing apparatus of the present embodiment comprises an input device 31, a representative color selecting device 32, an output device 34, a first color correcting device 33, a learning device 35, and a second color correcting device 36. Note that the first color correcting device 33 is identical with its counterpart in Embodiment 1 in function and structure, while the second color correcting device 36 is identical with its counterpart in Example 2 in function and structure. Other components except for the representative color selecting device 32 are identical with their respective counterparts in Embodiment 2, and the explanation of these components is not repeated for the explanation's convenience.

Note that the first color correcting device 33, second color correcting device 36, and learning device 35 form color correcting means. Also, note that the first color correcting device 33 includes a plurality of color correcting systems 37 as first color correcting systems and a color correcting system selecting section 38 serving as color correcting system selecting means, whereas the second color correcting device 36 includes a color correcting system 39 as a second reconstructible color correcting system.

The representative color selecting device 32 selects representative colors from the input original image, and outputs the same to the first color correcting device 33 first. Then, representative color selecting device 32 outputs the RGB signal of the input representative colors to the learning device 35 only when the input representative colors can not be corrected with satisfactory accuracy by any of the color correcting systems 37 therein, in other words, the error between the RGB signals of the representative colors before and after the color correction by any of the color correcting systems 37 is out of tolerance.

Thus, the color image processing apparatus arranged as above corrects the colors of the input image using the first color correcting device 33 alone when one of the color correcting systems 37 installed therein can correct the representative colors with satisfactory accuracy. Otherwise, the learning device 35 computes the coefficients, based on which the color correcting system 39 installed in the second color correcting device 36 is reconstructed to correct the original image in the same manner as Embodiment 2. Note that the reconstructed color correcting system 39 in the second color correcting device 36 has higher color correcting accuracy than the color correcting system 37 having the highest color correcting accuracy among those in the first color correcting device 33.

Consequently, the color correcting system 39 installed in the second color correcting device 36 is reconstructed only when the reconstruction is judged to be necessary based on the color correcting result on the representative colors. Thus, unnecessary reconstruction of the color correcting system 39 and ensuing needless color correcting operation can be omitted, thereby improving efficiency in the overall color correcting operation.

In the present embodiment, the characteristic representative colors are selected, and based on which the learning is carried out to reconstruct the color correcting system only when necessary. However, for some representative colors, the learning by the learning device 35 hardly improves the quality of the color-corrected image.

It takes quite a long time to find which representative color is hardly improved in quality in the color-corrected image, because the color image processing apparatus of the present embodiment examines each color correcting system 37 in the first color correcting device 33 in order of low color correcting accuracy.

To eliminate this problem, Embodiment 4 below describes a method of accelerating the RGB-CMY signal converting operation. In this method, the selected representative colors are not checked by all the color correcting systems 37 in order of low color correcting accuracy like in the first color correcting device 33, but whether the color correcting accuracy can be improved or not is checked with each representative color first, so that the color correcting system 39 will not be reconstructed when the improvement in color correcting accuracy is unlikely.

Embodiment 4

The following description will describe still another example embodiment of the present invention.

Figure 7:
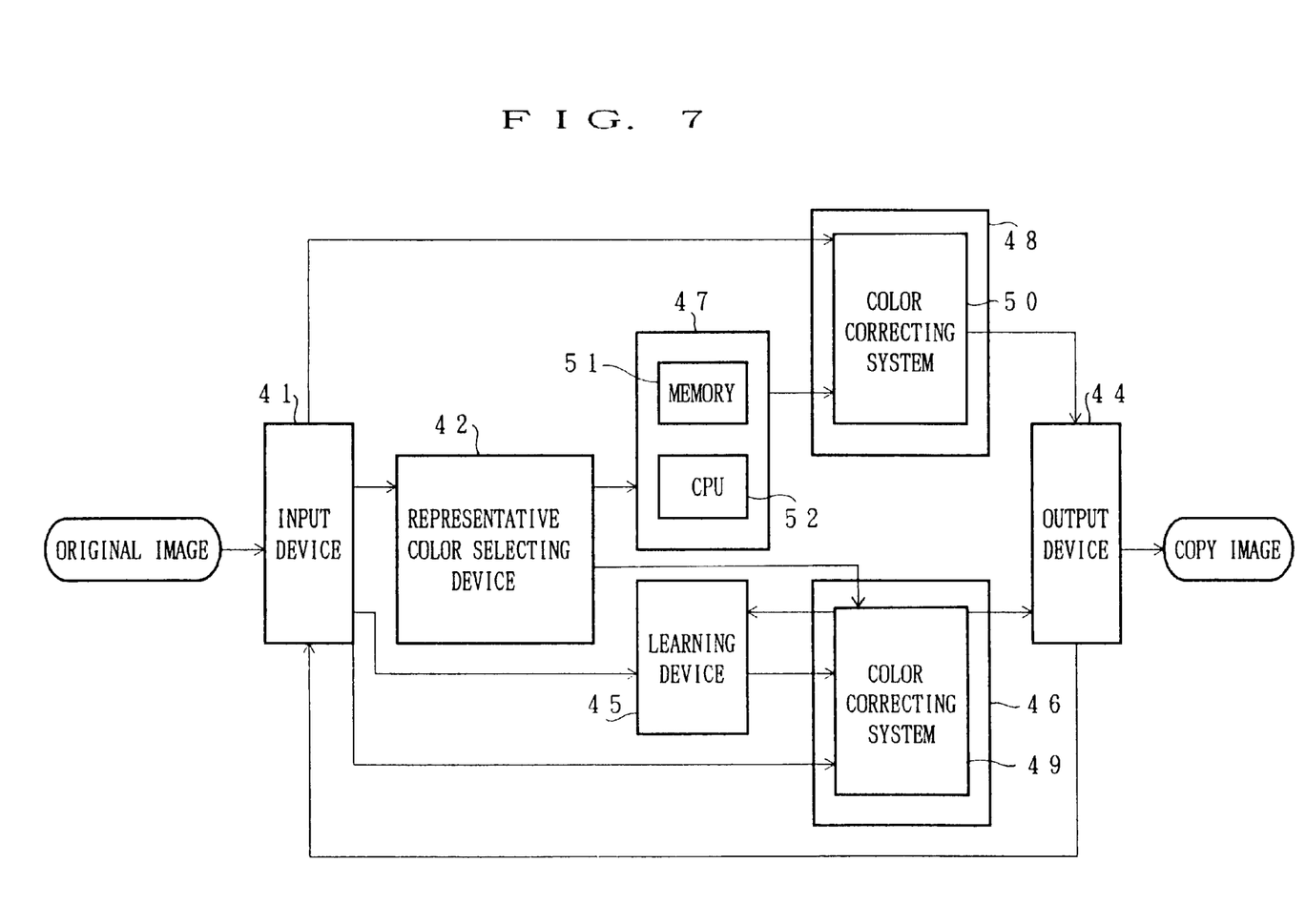
FIG. 7 is a block diagram showing a schematic structure of an example color image processing apparatus in accordance with a still another embodiment of the present invention.

Compared with its counterpart in Embodiment 3 of FIG. 6, a color image processing apparatus of the present embodiment additionally includes an image quality judging device. To be more specific, as shown in FIG. 7, the color image processing apparatus of the present embodiment comprises an input device 41, a representative color selecting device 42, an output device 44, a learning device 45, a second color correcting device 46, an image quality judging device 47 serving as image quality judging means, and a first color correcting device 48. Note that the input device 41, representative color selecting device 42, output device 44, learning device 45, and first color correcting device 46 are identical with their respective counterparts in Embodiment 3, and the explanation of these components is not repeated for the explanation's convenience. Also, note that each of the above components are controlled by unillustrated control means.

Herein, the first color correcting device 48, second color correcting device 46, learning device 45, and image quality judging device 47 form color correcting means. The first color correcting device 48 includes a color correcting system 50 as a first color correcting system, while the second color correcting device 46 includes a color correcting system 49 as a reconstructible second color correcting system. Further, the image quality judging device 47 comprises a memory 51 serving as storage means, a CPU 52 serving as both computing means and comparing means, and the like.

The image quality judging device 47 receives the RGB signal of the representative colors selected by the representative color selecting device 42, based on which whether the color correcting system 49 should be reconstructed or not is judged. The unillustrated control means controls the color image processing apparatus in the following manner.

When the image quality judging device 47 judges that the reconstruction is not necessary, the RGB signal of the input original image from the input device 41 is inputted into the first color correcting device 48, and converted into the CMY signal to be outputted from the output device 44.

When the image quality judging device 47 judges otherwise, the representative colors are converted into the CMY signal by the first color correcting device 48 and outputted to the output device 44. Then, the resulting image from the output device 44 is read by the input device 41 and the RGB signal of the same is outputted to the learning device 45 as the learning data, while the CMY signal of the color-corrected representative colors from the second color correcting device 46 is outputted to the learning device 45 as the teacher data.

The learning device 45 determines the coefficients as the coefficient of the color correcting system 49 in the second color correcting device 46 in the same manner as Embodiments 2 and 3 above based on the teacher data and learning data, and reconstructs the color correcting system 49, so that the RGB signal of the original image can be converted into the CMY signal with high accuracy.

Next, the image quality judging function of the image quality judging device 47 will be explained.

In a preferred example embodiment, the image quality judging device 47 has a judging function for judging whether the representative colors are specific colors which are sensitive to human eyes (hereinafter, referred to as specific colors), such as flesh tones and sky blue, which will be explained more in detail.

For example, the image quality judging device 47 pre-stores the RGB signals of the specific colors in the memory 51, and judges whether the selected representative colors are the specific colors or not by checking if the distance between the RGB signal of the representative colors and the RGB signals of the specific colors in the RGB space is within a predetermined range using the CPU 52. In other words, a distance between the respective representative colors and the respective specific colors is computed by Equation (7):

$$L = \sqrt{(R_s - R_i)^2 + (G_s - G_i)^2 + (B_s - B_i)^2} \tag{7}$$

where L is color coordinate distance within the RGB space between the respective specific colors and respective representative colors, $R_s$, $G_s$, and $B_s$ are color coordinates of each specific color, and $R_i$, $G_i$, and $B_i$ are color coordinates of each representative color. When L is equal to or smaller than a predetermined value, the respective representative colors ($R_i$, $G_i$, $B_i$) are judged as being the specific colors.

When so judged, the reconstruction of the color correcting system 49 is judged to be necessary for the input image. In this manner, the color image processing apparatus of the present embodiment reconstructs the color correcting system 49 installed in the second color correcting device 46 when the image quality judging device 47 judges that the respective representative colors are the specific colors. Consequently, the colors of the original image can be corrected with high accuracy.

In another preferred example embodiment, the image quality judging device 47 has a judging function for judging whether the representative colors are scattered throughout the color space or not in the following manner.

For example, the image quality judging device 47 computes an average value and a standard deviation of the representative colors by means of the CPU 52. When the average value of each of the R signal, G signal, and B signal of the representative colors is around the center of the RGB space, and the standard deviation of the same is greater than a predetermined value, the image quality judging device 47 judges that the representative colors are scattered throughout the color space. In this case, the color correcting system 49 is not reconstructed, and the input image is converted into the CMY signal by the color correcting system 50 installed in the first color correcting device 48.

Thus, when the representative colors are scattered throughout the color space, in other words, when the color correcting accuracy is hardly improved even if the color correcting system 49 is reconstructed, the color correcting operation is carried out by the optimal color correcting system 50 selected among those installed in the first color correcting device 48, thereby accelerating the overall color correcting operation.

Besides the aforementioned two functions, the image quality judging device 47 may include a function for withholding a value of the representative colors selected in the preceding color correcting operation. In this case, the distance between the representative colors selected in the current color correcting operation and those selected in the preceding color correcting operation within the color space is checked and if the distance is small, the color correcting system 49 is not reconstructed even when the representative colors are judged to be corrected by the color correcting system 49, and the coefficients used in the preceding operation and withheld in the color correcting system 49 is used again.

Thus, when successively making copies of the identical, or similar documents, that is to say, when the distance of the RGB signals within the color space is small, the color correcting system is not reconstructed for each page of the documents. Thus, a needless color correction is omitted, thereby further accelerating the overall color correcting operation.

Further, combining the above three functions can improve the judging accuracy of the image quality by the image quality judging device 47.

Figure 8:
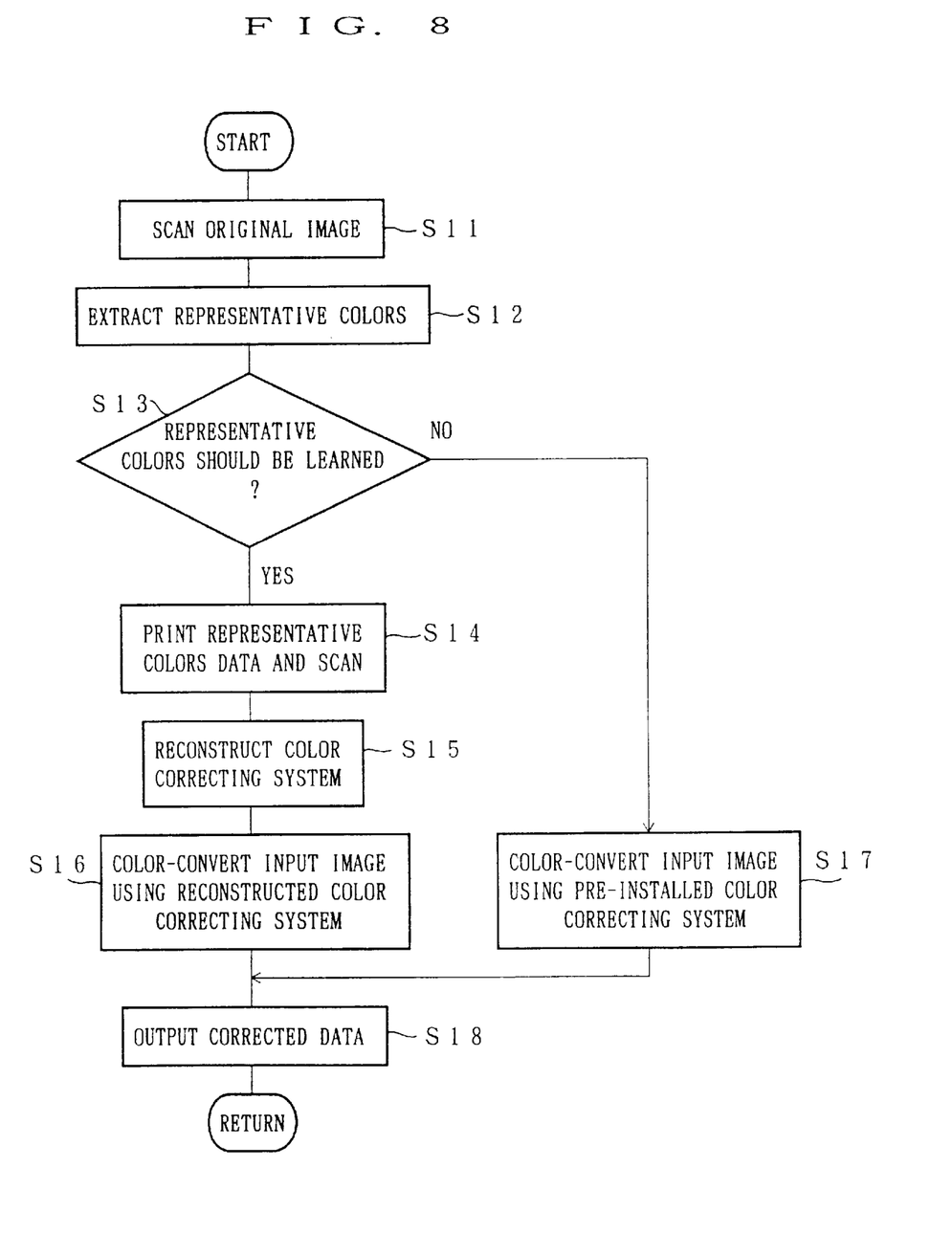
FIG. 8 is a flowchart of a color correcting operation of the color image processing apparatus of FIG. 7.

Next, the color correcting procedure of the color image processing apparatus arranged as above will be explained with reference to the flowchart of FIG. 8.

To begin with, the input device 41 scans an original image by means of the scanner to read the original image, and outputs the RGB signal of the original image to the representative color selecting device 42 (S11).

Then, the representative color selecting device 42 selects and extracts several to tens of characteristic representative colors from the input RGB signal (S12).

Subsequently, the image quality judging device 47 judges whether the extracted representative colors should be learned or not (S13). Here, when the image quality judging device 47 judges that the representative colors should be learned, the representative color data are corrected by the first color correcting device 48 and outputted through the printer of the output device 44. Then, the input device 41 again scans the above output image by means of the scanner (S14).

Then, the learning device 45 computes the matrix coefficients, linking coefficients or the like using the CMY signal produced out of the representative colors by the second color correcting device 46 as the teacher data, and the RGB signal of the output image based on the above CMY signal as the learning data. Accordingly, the color correcting system 49 installed in the second color correcting device 46 is reconstructed based on the above coefficients or the like thus computed (S15). Then, the RGB signal of the input image is converted into the CMY signal by the reconstructed color correcting system 49 (S16).

When the image quality judging device 47 judges that the representative colors should not be learned, the RGB signal of the input image is converted into the CMY signal by the color correcting system 50 installed in the first color correcting device 48 (S17).

Finally, a copy image is outputted from the printer of the output device 44 based on the CMY signal produced in either S16 or S17 (S18).

According to the color image processing apparatus arranged as above, the image quality judging device 47 judges whether reconstructing the color correcting system 49 is effective or not first, and the color correcting system 49 is reconstructed only when the reconstruction is judged as to be effective; otherwise, the color correction operation is carried out by the existing color correcting system 50. Thus, unnecessary reconstruction of the color correcting system 49 can be omitted, thereby accelerating the overall color correcting operation.

"When the reconstruction of the color correcting system 49 is effective" means that either the quality of the color-corrected image is improved by reconstructing the color correcting system 49, or an original image needs color correction with high accuracy. "When the reconstruction of the color correcting system 49 is not effective" means that either the quality of the color-corrected image is hardly improved by reconstructing the color correcting system 49, or an original image needs color correction with moderate accuracy.

Thus, the color image processing apparatus of the present embodiment carries out color correction throughout the color space with high accuracy when the high accurate color correction is necessary; otherwise, the color image processing apparatus carries out the same with moderate accuracy. Consequently, the color correcting operation can be carried out in the most efficient manner for each input image.

Also, since the above color image processing apparatus reconstructs the color correcting system 49 only when the color correcting accuracy can be improved by so doing, the quality of the color-corrected image can be upgraded. Consequently, an adequate color correcting operation is carried out for each input image to produce a copy image more faithful to the original image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of correcting colors for correcting a color separation signal of an original image obtained by reading said original image to approximate colors of a copy image to colors of said original image, comprising:
    a first step of selecting some of characteristic colors from all colors of said original image as representative colors; and
    a second step of correcting colors of a color separation signal of said representative colors, and correcting colors of said color separation signal of said original image based on an output of said representative colors after color correction;
    wherein said second step includes sub-steps of:
        (1) preparing a color correcting system;
        (2) converting said color separation signal of said representative colors into a color correcting signal;
        (3) outputting said color correcting signal as actual visible colors;
        (4) reading said output of said visible colors to produce a color separation signal of said representative colors after color correction; and
        (5) comparing said color separation signals of said representative colors before and after color correction to judge whether said representative colors are corrected adequately.

2. The method of correcting colors of claim 1, wherein said second step further includes the sub-steps of:
    (6) preparing another color correcting system when the correction of said representative colors is judged as being inadequate in said fifth sub-step, said another color correcting system and said color correcting system prepared in said first sub-step having their respective correcting rates and correcting accuracy, said another color correcting system having higher color correcting accuracy than said color correcting system prepared in said first sub-step; and
    (7) carrying out said second through sixth sub-steps until a color correcting system such that can correct said representative colors adequately is selected.

3. A method of correcting colors for correcting a color separation signal of an original image obtained by reading said original image to approximate colors of a copy image to colors of said original image, comprising:
    a first step of selecting some of characteristic colors from all colors of said original image as representative colors; and
    a second step of correcting colors of a color separation signal of said representative colors, and correcting colors of said color separation signal of said original image based on an output of said representative colors after color correction;
    wherein said second step includes sub-steps of:
        (1) preparing a color correcting system having a given coefficient;
        (2) converting said color separation signal of said representative colors into a color correcting signal using said color correcting system;
        (3) outputting said color correcting signal as actual visible colors;
        (4) reading said visible colors to obtain a color separation signal of said representative colors after color correction;
        (5) reconstructing said color correcting system in a best manner to said original image by changing said given coefficient based on said color-corrected color separation signal; and
        (6) correcting colors of said color separation signal of said original image using said reconstructed color correcting system.

4. The method of correcting colors of claim 1, wherein said second step further includes the sub-steps of:
    (6) further preparing both a plurality of first color correcting systems having their respective color correcting rates and color correcting accuracy and a second color correcting system having a given coefficient when the correction of said representative colors is judged as being inadequate in said fifth sub-step, said color correcting system prepared in said first sub-step and said plurality of first color correcting systems having different correcting rates and correcting accuracy; and (7) selecting one of said plurality of first correcting systems which can correct said representative colors adequately, said seventh sub-step including:
  (i) carrying out said second through fifth sub-steps using one of said plurality of first correcting systems to judge whether said first correcting system corrects said representative colors adequately or not; and
  (ii) selecting said first correcting system when said first correcting system is judged to be able to correct said representative colors adequately, and otherwise carrying out said second through fifth sub-steps using another first correcting system having higher correcting accuracy to judge said another first correcting system corrects colors adequately or not, (8) reconstructing said second color correcting system in a best manner for said original image by changing said coefficient using said representative colors when said color representative colors are not corrected adequately by the first color correcting system having the highest accuracy.

5. A method of correcting colors for correcting a color separation signal of an original image obtained by reading said original image to approximate colors of a copy image to colors of said original image, comprising:
a first step of selecting some of characteristic colors from all colors of said original image as representative colors; and
a second step of correcting colors of a color separation signal of said representative colors, and correcting colors of said color separation signal of said original image based on an output of said representative colors after color correction;
wherein said second step includes sub-steps of:
  (1) preparing a first color correcting system having a constant color-correcting coefficient and a second color correcting system having a given coefficient;
  (2) judging whether colors are corrected effectively or not by said second color correcting system; and
  (3) correcting colors using said first color correcting system when using said second color correcting system is judged to be ineffective, and otherwise correcting colors using said second color correcting system.

6. The method of correcting colors of claim 1, wherein said first step includes a sub-step of mapping all the colors of said original image on a color space created based on color components thereof, and extracting a predetermined number of colors in order of farther distance within said color space as said representative colors.

7. A color image processing apparatus for outputting a copy image after correcting colors of an input original image, comprising:
read means for reading an original image to produce a color separation signal;
color correcting means for correcting colors of said color separation signal;
image output means for outputting a visible image based on said color-corrected color separation signal; and
representative color selecting means for selecting some of characteristic colors from all colors of said original image as representative colors based on said color separation signal;
wherein said color correcting means corrects colors of the color separation signal of said representative colors first, and thence corrects colors of the color separation signal of said original image based on an output of said color-corrected representative colors outputted from said image output means; and
wherein said color correcting means includes:
  a plurality of color correcting systems having their respective color correcting rates and color correcting accuracy; and
  color correcting system selecting means for selecting one of said plurality of color correcting systems which can correct said representative colors in a best manner;
  whereby said color correcting means corrects the colors of the color separation signal of said original image using the color correcting system selected by said color correcting system selecting means.

8. The color image processing apparatus of claim 7, wherein said color correcting system selecting means includes judging means for judging whether a correcting error of the currently selected color correcting system is within predetermined tolerance or not by comparing the color separation signal of said representative colors and a color separation signal of said color-corrected representative colors;
whereby said color correcting means corrects colors of said original image using said currently selected color correcting system when said correcting error is within said predetermined tolerance, and otherwise said judging means judges a error of another color correcting system, said color correcting systems being selected sequentially in order of low color correcting accuracy.

9. A color image processing apparatus for outputting a copy image after correcting colors of an input original image, comprising:
read means for reading an original image to produce a color separation signal;
color correcting means for correcting colors of said color separation signal;
image output means for outputting a visible image based on said color-corrected color separation signal; and
representative color selecting means for selecting some of characteristic colors from all colors of said original image as representative colors based on said color separation signal;
wherein said color correcting means corrects colors of the color separation signal of said representative colors first, and thence corrects colors of the color separation signal of said original image based on an output of said color-corrected representative colors outputted from said image output means; and
wherein said color correcting means includes:
  a color correcting system having a given coefficient for correcting colors; and
  learning means for computing a coefficient such that enables an optimal color correction for said original image based on teacher data and learning data, said teacher data being a color correcting signal obtained by correcting said representative colors of said original image using said color correcting system, said learning data being a color separation signal obtained by reading said outputted visible image of said color-corrected representative colors by said read means;
  whereby said color correcting system is reconstructed adequately for said original image by replacing its coefficient with said coefficient computed by said learning means to correct colors of said original image.

10. A color image processing apparatus for outputting a copy image after correcting colors of an input original image, comprising:

read means for reading an original image to produce a color separation signal;

color correcting means for correcting colors of said color separation signal;

image output means for outputting a visible image based on said color-corrected color separation signal; and representative color selecting means for selecting some of characteristic colors from all colors of said original image as representative colors based on said color separation signal;

wherein said color correcting means corrects colors of the color separation signal of said representative colors first, and thence corrects colors of the color separation signal of said original image based on an output of said color-corrected representative colors outputted from said image output means; and wherein said color correcting means includes:

a plurality of first color correcting systems having their respective color correcting rates and color correcting accuracy;

color correcting system selecting means for selecting one of said plurality of first color correcting systems which can correct said representative colors by correcting said representative colors using said plurality of color correcting systems sequentially;

a second color correcting system having a given color correcting coefficient; and learning means for computing a coefficient such that enables an optimal color correction for said original image based on teacher data and learning data, said teacher data being a color correcting signal obtained by correcting colors of the representative colors using said second color correcting system, said learning data being a color separation signal obtained by reading said outputted visible image of said color-corrected representative colors by said read means;

whereby said color correcting means corrects the colors of the color separation signal of said original image using said selected first color correcting system, and when neither said selected first color correcting system nor the first color correcting system having highest correcting accuracy can correct said representative colors adequately, said color correcting means corrects colors of the color separation signal of said original image by reconstructing said second color correcting system adequately for said original image by replacing its coefficient with said coefficient computed by said learning means to correct colors of said original image.

11. A color image processing apparatus for outputting a copy image after correcting colors of an input original image, comprising:

read means for reading an original image to produce a color separation signal;

color correcting means for correcting colors of said color separation signal;

image output means for outputting a visible image based on said color-corrected color separation signal; and representative color selecting means for selecting some of characteristic colors from all colors of said original image as representative colors based on said color separation signal;

wherein said color correcting means corrects colors of the color separation signal of said representative colors first, and thence corrects colors of the color separation signal of said original image based on an output of said color-corrected representative colors outputted from said image output means; and wherein said color correcting means includes:

a first color correcting system having a constant color correcting coefficient;

a second color correcting system having a given color-correcting coefficient;

learning means for computing a coefficient such that enables an optimal color correction for said original image based on teacher data and learning data, said teacher data being a color correcting signal obtained by correcting colors of said representative colors using said second color correcting system, said learning data being a color separation signal obtained by reading said outputted visible image of said color-corrected representative colors by said read means; and judging means for judging whether correcting said representative colors by said second color correcting system is effective or not;

whereby said color correcting means corrects colors of said original image using said first color correcting system when color correction by second color correcting system is judged to be ineffective, and otherwise reconstructs said second color correcting system adequately to said original image by replacing its coefficient with said coefficient computed by said learning means.

12. The color image processing apparatus of claim 7, wherein at least one of said plurality of color correcting systems adopts a color correcting matrix method.

13. The color image processing apparatus of claim 7, wherein at least one of said plurality of color correcting system adopts a neural network method.

14. The color image processing apparatus of claim 7, wherein said plurality of color correcting systems adopt at least one color correcting method from a group consisting of a color correcting matrix method, a color correcting neural network method, and a color correcting look-up table method.

15. The color image processing apparatus of claim 9, wherein said color correcting system adopts a color correcting matrix method having a matrix coefficient, whereby said color correcting system is reconstructed by changing said matrix coefficient.

16. The color image processing apparatus of claim 9, wherein said color correcting system adopts a color correcting neural network method which correct colors using a network having a plurality of converting layers and a linking coefficient between layers, whereby said color correcting system is reconstructed by changing said linking coefficient.

17. The color image processing apparatus of claim 11, wherein said judging means judges that correcting said representative colors by said second color correcting system is effective when said judging means judges that said respective representative colors are specific colors, said each specific color being predetermined and demanding color correction with high accuracy.

18. The color image processing apparatus of claim 17, wherein said judging means includes:

storage means for storing coordinates within a color space of said specific colors, and a pre-set value used as a reference value when said representative colors and said specific colors are compared, respectively;

computing means for computing a distance between said respective representative colors and said respective specific colors using the coordinates within said color space of said specific colors in said storage means and coordinates within a color space of said representative colors; and comparing means for comparing said computed distance with said pre-set value in said storage means;

whereby said judging means judges said respective representative colors are said specific colors when said distance is smaller than said pre-set value.

19. The color image processing apparatus of claim 11, wherein said judging means judges that correcting said representative colors by said second color correcting system is ineffective when said judging means judges that said representative colors are scattered throughout a color space thereof.

20. The color image processing apparatus of claim 19, wherein said judging means includes computing means for computing an average value and a standard deviation of each color component of the color separation signal of said representative colors;

whereby said judging means judges that said representative colors are scattered throughout said color space when said each average value is around a center of said color space and said each standard deviation is greater than a pre-set value.

21. The color image processing apparatus of claim 11, wherein, when there is a minor color difference between said representative colors and representative colors used in a preceding color correcting operation, said judging means judges to carry out a color correcting operation using the color correcting system used in said preceding color correcting operation.

* * * * *